United States Patent
Malhotra et al.

(10) Patent No.: US 11,601,354 B2
(45) Date of Patent: Mar. 7, 2023

(54) DISTRIBUTED PACKET CAPTURE

(71) Applicant: MICROSOFT TECHNOLOGY LICENSING, LLC, Redmond, WA (US)

(72) Inventors: Nitish Malhotra, San Diego, WA (US); Sarath Chandra Reddy Sanamreddy Venkata, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/226,038

(22) Filed: Apr. 8, 2021

(65) Prior Publication Data
US 2022/0329505 A1   Oct. 13, 2022

(51) Int. Cl.
| G06F 9/50 | (2006.01) |
| G06F 9/54 | (2006.01) |
| H04L 43/12 | (2022.01) |
| H04L 43/20 | (2022.01) |
| H04L 43/0811 | (2022.01) |
| H04L 67/141 | (2022.01) |

(52) U.S. Cl.
CPC ........ H04L 43/0811 (2013.01); H04L 67/141 (2013.01)

(58) Field of Classification Search
CPC ............................ H04L 43/0811; H04L 67/141
See application file for complete search history.

(56) References Cited

U.S. PATENT DOCUMENTS

| 10,212,041 | B1 | 2/2019 | Rastogi et al. |
| 2019/0379590 | A1* | 12/2019 | Rimar ................. G06F 16/9024 |
| 2020/0073692 | A1* | 3/2020 | Rao .................... H04L 41/0893 |
| 2020/0112487 | A1 | 4/2020 | Inamdar et al. |
| 2020/0241903 | A1* | 7/2020 | Wang .................... H04L 41/12 |

FOREIGN PATENT DOCUMENTS

CN       111901203 A  * 11/2020  ............. H04L 43/04

OTHER PUBLICATIONS

"Ksniff", Retrieved from: https://web.archive.org/web/20210108111028/https:/github.com/eldadru/ksniff, Jan. 8, 2021, 5 Pages.
"Packet Capture", Retrieved from: https://web.archive.org/web/20200806132339/https:/avinetworks.com/docs/20.1/packet-capture/, Aug. 6, 2020, 6 pages.

(Continued)

Primary Examiner — Christopher B Robinson
(74) Attorney, Agent, or Firm — Han Gim; Newport IP, LLC

(57) ABSTRACT

Techniques are disclosed for capturing network traffic in a distributed computing environment comprising a plurality of computing devices executing a plurality of Kubernetes pods. A customer resource definition defines one or more capture filters. Based on the capture filters, a configuration map object specifying data packets to be captured is generated. Capture sidecars are injected at the Kubernetes pods. At each Kubernetes pod the configuration map object is read and a capture of the specified data packets is initiated.

20 Claims, 5 Drawing Sheets

(56) References Cited

OTHER PUBLICATIONS

Doyle, Duncan, "Using sidecars to analyze and debug network traffic in OpenShift and Kubernetes pods", Retrieved from: https://developers.redhat.com/blog/2019/02/27/sidecars-analyze-debug-network-traffic-kubernetes-pod/, Feb. 27, 2019, 12 Pages.

Mendonca, et al., "Manage packet captures with Azure Network Watcher using the portal", Retrieved from: https://docs.microsoft.com/en-us/azure/network-watcher/network-watcher-packet-capture-manage-portal, Jan. 7, 2021, 5 Pages.

"5G and the Cloud—A 5G Americas White Paper", In the White paper of 5G Americas, Dec. 2019, 53 Pages.

Larrson, Magnus, "Chapter 18—Using a Service Mesh to Improve Observability and Management", Published in Hands-On Microservices with Spring Boot and Spring Cloud, Sep. 20, 2019, pp. 527-589.

"International Search Report and Written Opinion Issued in PCT Application No. PCT/US22/020669", dated May 30, 2022, 13 Pages.

\* cited by examiner

DISTRIBUTED PACKET CAPTURE

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management.

In many cases, the data center may want to capture packets for a variety of reasons, such as to investigate network connectivity issues. Troubleshooting network connectivity issues may be difficult to perform given the complexity of the networks in data centers. It is with respect to these considerations and others that the disclosure made herein is presented.

SUMMARY

End-to-end network diagnostics in a datacenter can be difficult and costly. There may be multiple routers/switches, containers, and end hosts involved, and it may be difficult to identify issues such as diagnosing where and if any packet loss is occurring. In a distributed computing environment such as a clustered Kubernetes environment, packet tracing can be a processing and labor-intensive task. In such an environment, a user or service must ensure that every container of a pod or cluster of interest has the necessary packet capture services. The user or service must then log into each container and launch a packet analyzer function such as TCPdump. The captured data may be stored in a temporary location in the container, which must then be copied over to the local machine. Furthermore, since traffic is typically balanced across the pods using a load balancer, the user or service can only see the data traffic that the specific pod is receiving and thus may not have visibility to all the traffic that the Kubernetes service is receiving. The user or service must therefore access every pod that is in the Kubernetes service and repeat the procedure. Additionally, due to the ephemeral nature of Kubernetes clusters where the number of pods can scale up or down, the described process must be repeated when new pods are created or the captured data must account for deleted pods.

The disclosed embodiments describe technologies for a consistent and centralized way to capture data packets in a Kubernetes environment across multiple protocols and interfaces and from multiple Kubernetes pods. This may allow data centers to more effectively adhere to operational objectives and at the same time improve operating efficiencies.

In various embodiments, methods and systems are disclosed for a centralized packet capture service that allows a user to call a Kubernetes service and declare a service of interest for capturing data traffic using custom resource definitions (CRDs). In some embodiments, the user may identify capture filters for the capture service, which generates a declarative specification. A singular configuration map object may be generated based on the declarative specification for all the pods in the service.

In some embodiments, the pods may execute capture agent containers deployed as sidecars to application pods using automatic sidecar injection or static configuration. The sidecars may be configured to look for the configuration map objects which include information about the packets to be captured, the duration of the capture operation, the amount of data for the capture, and other details. Each pod that supports the capture service and is executing the capture sidecar thus reads the configuration map object and initiates a capture of the specified packets. Any new pods that are instantiated will also load the configuration map object and join the specified capture service.

Rather than storing captured data in each local pod, in an embodiment a streaming service and/or centralized capture location may be provided for collecting and collating the captured packets. In one embodiment, centralized capture location may be at a gRPC server that runs with the deployment that can be scaled up or down. The sidecars that are capturing data packets may establish a connection with the capture stream server. Based on preamble metadata specifying the capture details, the sidecars may stream packets as binary gRPC data to the capture stream server. The capture stream server may parse the metadata in the preamble and load the capture packet file in a directory denoted by a capture ID or the rule ID. In other embodiments, other streaming data captures services may be implemented such as GRE tunneling.

By providing such a mechanism for capturing data packets, data centers may operate more efficiently, and reduction or loss of services provided by service providers may be avoid or mitigated, reducing downtime and impact to end users and providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
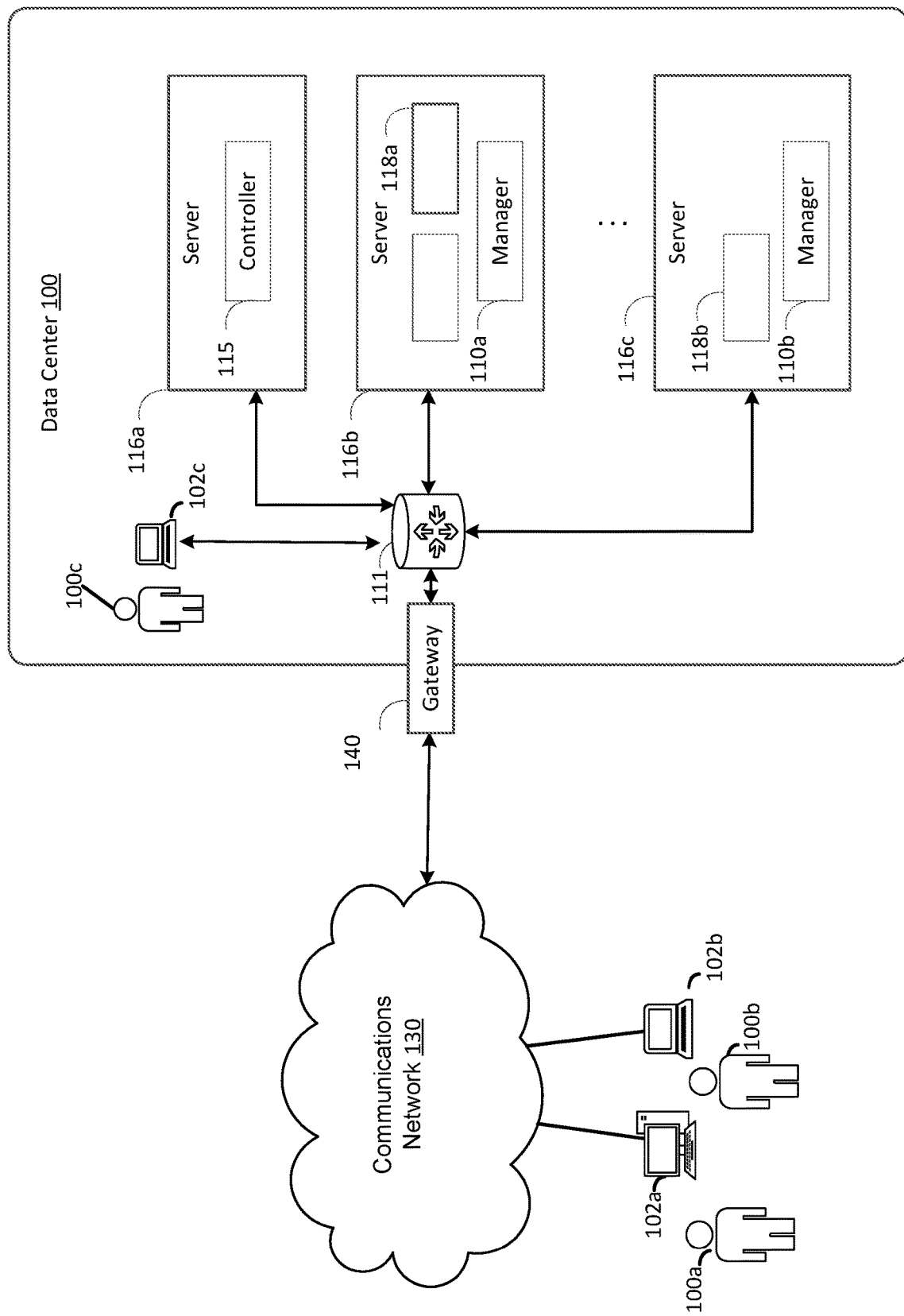
FIG. 1 is a diagram illustrating a data center in accordance with the present disclosure.

The following Detailed Description describes technologies for capturing data packets in a Kubernetes environment across multiple protocols and interfaces and from multiple Kubernetes pods. In such networks, it may be difficult, for example, to capture packet data to troubleshoot and identify network issues, in particular capturing packets that are being transmitted in the physical network.

In a clustered Kubernetes environment, packet tracing can be a processing and labor-intensive task. In such an environment, a user or service must ensure that every container of a pod or cluster of interest has the necessary capture services. The user or service must then log into each container and launch a packet analyzer function such as TCPdump. The captured data is stored in a temporary location in the container, which must then be copied over to the local machine. Furthermore, since traffic is typically balanced across the pods using a load balancer, the user or service can only see the data traffic that the specified pod is receiving and does not have visibility to all the traffic that the Kubernetes service is receiving. The user or service must therefore access every pod that is in the Kubernetes service and repeat the procedure. Additionally, due to the ephemeral nature of Kubernetes clusters where the number of pods can scale up or down, the described process must be repeated when new pods are created or the captured data must account for deleted pods.

One example where such issues can be applicable is a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Described herein are methods and systems for a unified and centralized way to capture data packets in a distributed computing environment across multiple protocols and interfaces and from multiple clusters of computing nodes. Embodiments may allow for the capture of data packets, for example, in a Kubernetes environment across multiple protocols and interfaces and from multiple Kubernetes pods. In one implementation, a centralized capture service allows a user to call a Kubernetes service and declare a service of interest for capturing data traffic using custom resource definitions (CRDs). The user also identifies capture filters for the capture service, which may generate a declarative specification. In some embodiments, an input tool may be provided that enables a user to create, invoke, and delete packet captures. The input tool may also be configured to enable the user to retrieve captured data. A singular configuration map object may be generated based on the declarative specification for all the pods in the service.

The pods may execute capture agent containers deployed as sidecars to application pods using automatic sidecar injection or static configuration. The sidecars may be configured to look for the configuration map objects which may include information about the packets to be captured, the duration of the capture operation, the amount of data for the capture, and other details. Each pod that supports the capture service and is executing the capture sidecar thus reads the configuration map object and initiates a capture of the specified packets. Any new pods that are instantiated may also load the configuration map object and join the specified capture service. In some embodiments, the sidecars may be added to all pods in the deployment. In other embodiments, the sidecars may be added selectively to desired pods and clusters, for example to conserve resources. Additionally, the sidecars may be added during initialization. Alternatively, the sidecars may be added during runtime and in some embodiments, the sidecars may be removed when the specified capture is completed.

In some embodiments, packets may be captured at the node level or at the server level. In this way, packets that have been processed after leaving a pod can be captured for analysis and troubleshooting.

Rather than storing captured data in each local pod, in some embodiments a streaming service and/or centralized capture location may be provided for collecting and collating the captured packets. Streaming may be provided using various streaming protocols. In one embodiment, the centralized capture location may be implemented at a gRPC server that runs with the deployment and can be scaled up or down. The sidecars that are capturing data packets may establish a connection with the capture stream server. Based on preamble metadata specifying the capture details, the sidecars may stream packets as binary gRPC data to the capture stream server. The capture stream server may parse the metadata in the preamble and load the capture packet file in a directory denoted by a capture ID or the rule ID. In other embodiments, a secure streaming service such as GRE tunneling may be implemented.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118*b* (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102*a*, 102*b* or 102*c* may be a server, a desktop or laptop personal computer, a tablet computer, a smartphone, a set-top box, or any other computing device capable of accessing data center 100. User computer 102*a* or 102*b* may connect directly to the Internet (e.g., via a cable modem). User computer 102*c* may be internal to the data center 100 and may connect directly to the resources in the data center 100 via internal networks. Although only three user computers 102*a*, 102*b*, and 102*c* are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120*a* or 120*b* (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116*a* and 116*b*. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 2:
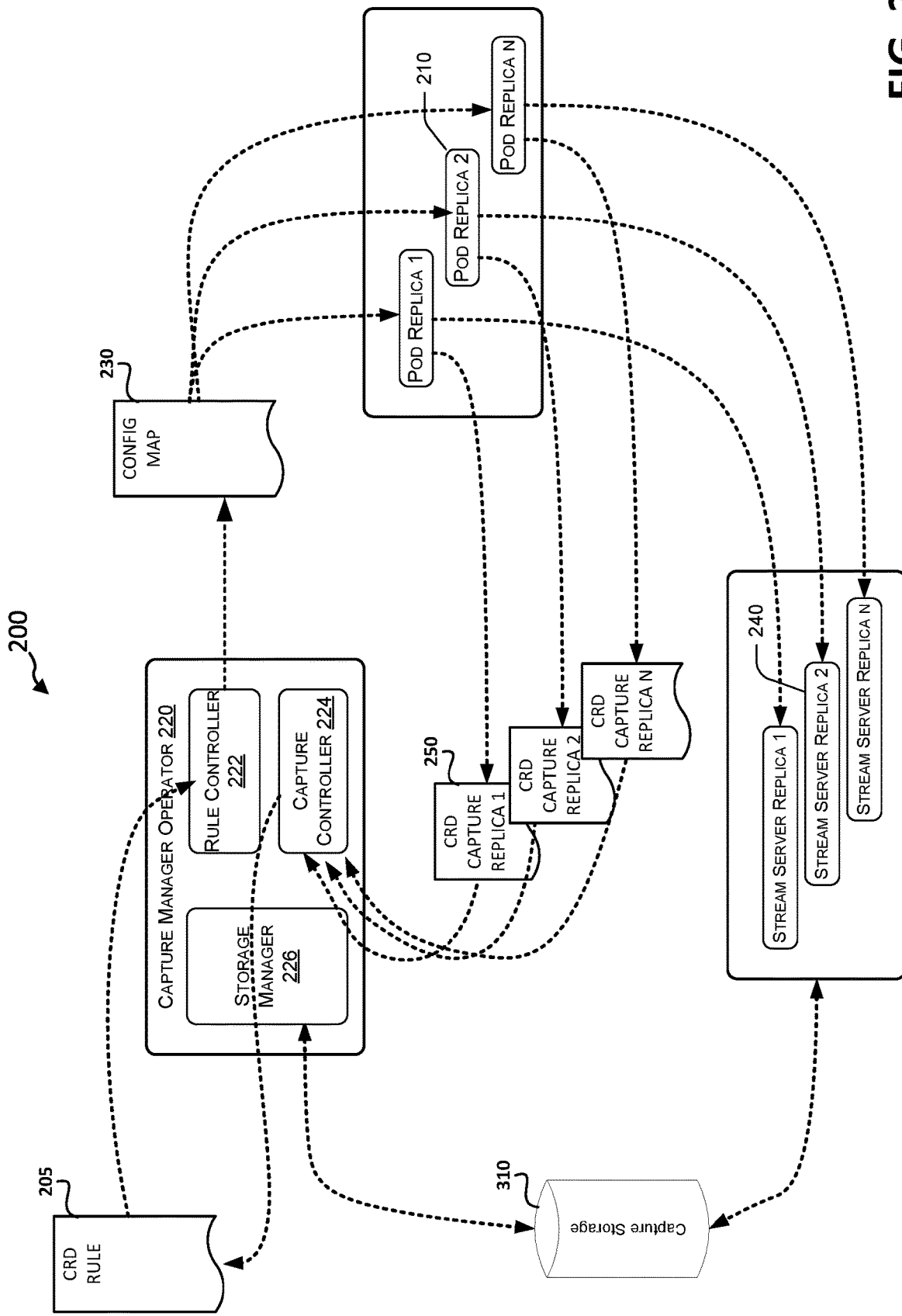
FIG. 2 is a diagram illustrating further details of a distributed packet capture service in accordance with the present disclosure.

Referring to FIG. 2, disclosed herein is a cloud-native distributed packet capture function 200 that is capable of capturing traffic across multiple protocols and interfaces and from one or more Kubernetes pods (e.g., replicas/HPA) serving a target application or Kubernetes service. The distributed packet capture function 200 uses capture agent containers deployed as sidecars to application pods. The sidecars may be deployed using automatic sidecar injection or static configuration. In some embodiments, the sidecars may be added to all pods in the deployment. In other embodiments, the sidecars may be added selectively to desired pods and clusters, for example to conserve resources. Additionally, the sidecars may be added during initialization. Alternatively, the sidecars may be added during runtime and in some embodiments, the sidecars may be removed when the specified capture is completed. A central capture manager and scalable capture stream servers may orchestrate the packet captures, report status of the captures, and manage the capture files. In an embodiment, the capture files may be stored or provided in .pcap or .pcapng format.

The distributed packet capture utility 200 may leverage the operator pattern and custom resource definitions (CRDs) to provide a declarative capture utility rather than one based on a CLI or REST API to execute the captures. The use of CRDs and operators allows cluster administrators and operators to integrate capture tasks into their Helm charts and start the capture tasks at deployment time. An example would be to capture Call Control (CC) traffic from the time the federation is started and running the capture until the federation is torn down. The distributed packet capture utility 200 also provides the capability to run snapshot captures in real-time for debugging needs. In some embodiments, packets may be captured at the node level or at the server level. In this way, packets that have been processed after leaving a pod can be captured for analysis and troubleshooting.

In some embodiments, an input tool may be provided that enables a user to create, invoke, and delete packet captures. The input tool may also be configured to enable the user to retrieve captured data.

The sidecar capture agents provide the capability to capture traffic from any interface on the pod (eth0, lo, etc.) while allowing users to specify capture filters (using the rule specification) by running a capture utility, similar to tcpdump written in Go (gopacket, which is a wrapper over libpcap), that can capture and stream live packets (with support for binary data) to gRPC stream servers on the capture stream servers.

The custom resource (CRD) rule 205 may be used to specify the target application/service pods (replicas) 210 and allow the user to specify filters and capture limits such as max bytes, max packet count and/or capture duration, as part of the spec subresource of the rule specification. In an embodiment, the filters may be specified in the BPF format. The status section of this resource may be used to provide updates on the capture to the end-user and may be used to reflect the running vs completed state of the capture and also provide the final capture directory path (and other additional metadata).

A capture manager operator 220 may be implemented that utilizes the Operator SDK framework to extend the Kubernetes API server with CRDs. The operator defines two CRDs—a Rule resource and a Capture resource, which are further detailed herein. For each registered CRD, the operator may execute a separate control loop that is programmed to react to and reconcile events generated by the watched resource.

A rule controller 222 may be implemented that is configured to drive packet captures on replicas of pod types, based on the specification provided in the rule resource object. The target pod replicas 210 backed by a service resource may be selected using the service's "labelSelector". The rule controller 222 may be configured to handle create/update/delete events on the rule CRDs 205 by generating a Kubernetes Configmap 230 (tagged with the aforementioned, matching service labels) in the same namespace as the rule instance. The data section of the Configmap 230 may include the details for packet capture, derived from the rule instance .spec. The instance .spec contains information about the requested capture such as the interface name, packet capture filters (BPF), the capture limits (number of packets, number of bytes, snapshot length, duration, etc.) among others. Additionally, the generated Configmap 230 may also be tagged with the OwnerReference of the parent rule instance that triggers the capture. This allows the API server to garbage collect all child resources when the parent rule instance is deleted.

A capture controller 224 may be implemented for watching and reconciling capture resources. The capture controller 224 may be configured to watch for status updates on the capture instances and update the associated parent rule instance (found using the OwnerReference info) with the current "status" of the packet capture. A capture instance may have a one-to-one relationship to the pod instance (replica) streaming captured packets to the stream server. The capture status subsection may reflect the last capture status for packet capture from a target replica. The capture instances may be created individually by each target replica and contain the OwnerReference of the parent rule resource. The owner/parent information may be retrieved from the Configmap 230 that the target replica uses to configure and start the capture.

The storage manager 226 may be an independent process configured to manage the storage resource used for persisting capture files. In one embodiment, storage manager 226 may mount the storage file system persistent volume/persistent volume claim (PV/PVC) into its file system using Kubernetes volumes.

The capture agent container 250 may be deployed as a sidecar container, either statically or using automatic sidecar-injection. The capture agent 250 provides a mechanism to capture packets from the exposed network interfaces (e.g., the lo interface can be used to capture cleartext traffic when mTLS is enabled). The packet capture data and metadata may then be streamed to a stream server (capture stream servers) over gRPC.

In some embodiments, capture agent 250 may be written in Go and may utilize the gopacket, a Go wrapper around C libpcap, to provide packet capture and BPF-based filtering capabilities. The capture agent 250 may be configured to run multiple concurrent captures across its interfaces.

The packet capture agent sidecars in the application pods may be injected during deployment time by the Open Policy Agent (OPA) by adding an admission controller webhook. In one embodiment, the OPA may inject the capture-agent side cars into all pods that are a subset of namespaces with label "capture-agent=enabled". If any specific application chooses to disable the injection of the packet capture agent, then the pod may be be annotated with "capture-agent.affirmednetworks.com/inject=ignore".

In some embodiments, packet capture limits based on capture duration may be enforced by the sidecar.

In some embodiments, capture agent 250 may initiate a gRPC stream when events on Configmap(s) match the pod's own labels (e.g., app=name+owner=capture-manager).

In an embodiment, in response to receiving an OnCreate event, capture agent 250 may initiate a packet capture on the interface using the provided capture specification. For OnUpdate events, the capture agent 250 may stop and restart a stream of captured packets. For OnDelete, the capture agent 250 may close the respective gRPC stream session (if in Running state) from the client-side.

After a capture gRPC stream is initiated, the capture agent 250 may generate a new CRD to signal the start of a capture to the capture manager 220 by setting the status to running. The capture object may contain the parent rule instance's OwnerReference that is retrieved from the capture specification Configmap.

On the close of the gRPC stream from either the client-side or the server-side, the respective capture object may be updated by the capture agent 250, with the completed status value and the final capture summary. In one embodiment, to capture clear-text traffic for a pod, the "loopback (lo)" interface may be used in applications that utilize the Istio sidecar for mTLS. The traffic observed on the non-loopback interfaces will typically see encrypted traffic if mTLS is enabled in the application namespace.

In some embodiments, a capture stream server 240 may be implemented. The server may be a highly available, horizontally scalable deployment that utilizes Kubernetes Replicasets and Horizontal Pod Autoscalar (HPA) using metrics exported to Prometheus. The stream server 240 may be configured to act as a gRPC stream server and collate packet capture data from the capture agent sidecar instances into capture files in .pcap or .pcapng format. The use of gRPC is one example implementation. In some embodiments, other streaming protocols may be used, such as GRE tunneling.

In one example, files may be saved to the mounted storage volume under <base-path>/captures/<rule-name>/<prefix>—<pod-uid>.pcap. The capture stream server 240 may also be configured to totate the files as the capture data being stored in these files reaches the configurable maximum capacity (e.g., cap and close file at 5 MB). The closed capture file may then be renamed by appending the rotation timestamp to the named file, and the latest captured packets may continue to be stored in the zeroed out original file. The closed capture file may be renamed with extensions ranging from 0-9 (configurable limit), with 9 being the oldest, and the newer received data may be stored in a named file (without any extensions). The received stream of packet capture data from different pod instances, of a target application or service, may result in separate capture files.

The capture stream server 240 may be configured to enforce capture limits pertaining to maximum bytes and maximum packet count per capture.

A file consolidator function may be implemented that consolidates the pcaps from all the replicas of a single application with a matching rule ID.

Before starting the packet capture, it may be verified that the capture stream server 240 has been injected into application pods. After the capture stream server 240 is successfully injected, the capture may be started by deploying the rule in the application namespace. To start the packet capture while bringing up the application federation, the above described rule may be added to the helm charts at the federated level.

Figure 3:
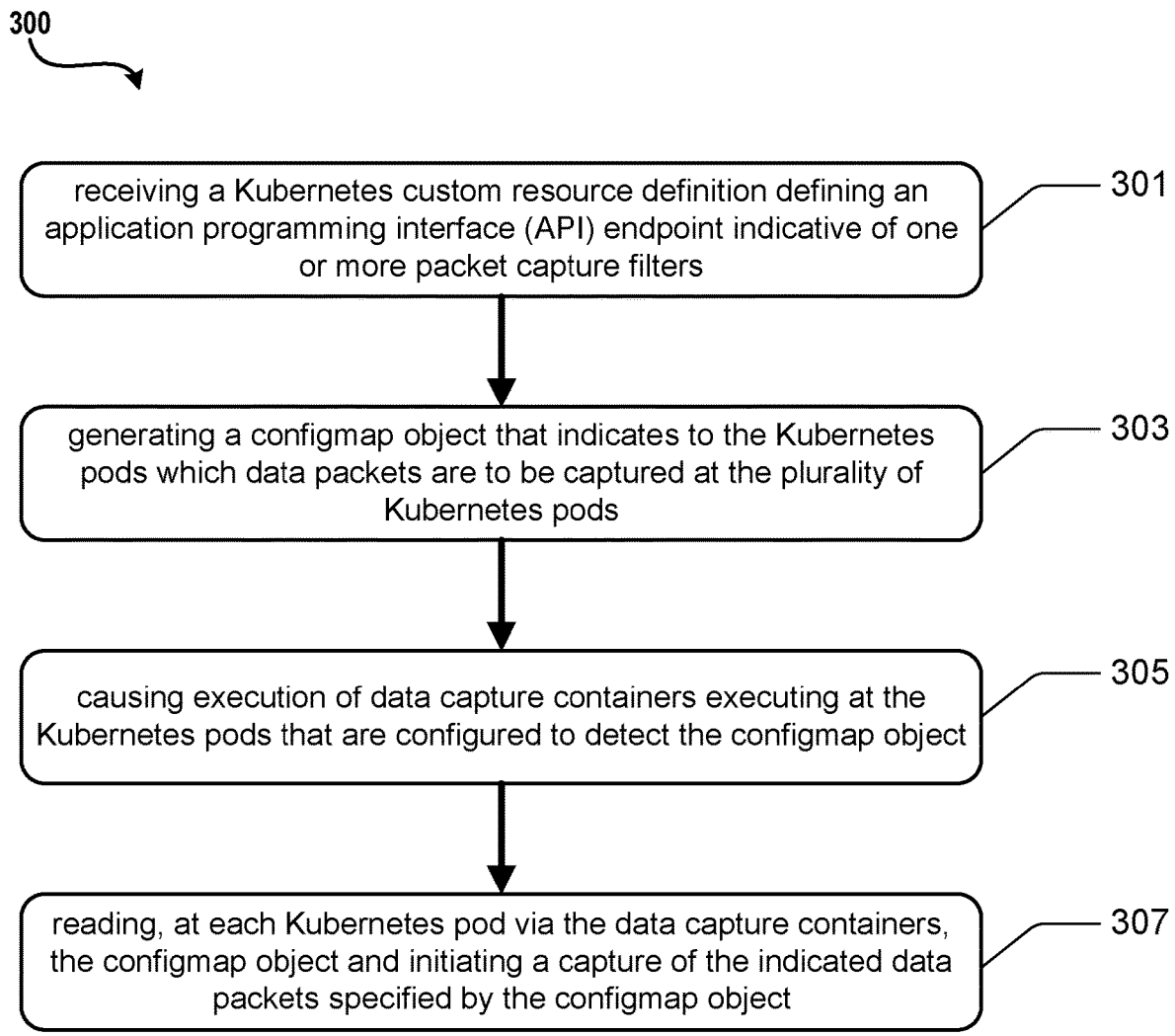
FIG. 3 is a flowchart depicting an example procedure for diagnosing network issues in accordance with the present disclosure.

Turning now to FIG. 3, illustrated is an example operational procedure for adding a native utility for capturing network traffic across a plurality of interfaces in a cloud computing environment in accordance with the present disclosure. In an embodiment, the cloud computing environment comprises a plurality of computing devices executing a plurality of Kubernetes pods comprising one or more containers. In an embodiment, the network traffic is associated with a target application or service provided by the Kubernetes pods. Such an operational procedure may provide for capturing network traffic and can be provided by one or more components illustrated in FIG. 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates receiving, by a packet capture service executing in the cloud computing environment, a Kubernetes custom resource definition defining an application programming interface (API) endpoint indicative of one or more packet capture filters. In an embodiment, the packet capture filters define network traffic to be captured by the packet capture service.

Operation 301 may be followed by operation 303. Operation 303 illustrates based on the packet capture filters, generating, by the packet capture service, a configmap object that indicates to the Kubernetes pods which data packets are to be captured at the plurality of Kubernetes pods.

Operation 303 may be followed by operation 305. Operation 305 illustrates causing, by the packet capture service, execution of data capture containers executing at the Kubernetes pods that are configured to detect the configmap object.

Operation 305 may be followed by operation 307. Operation 307 illustrates reading, at each Kubernetes pod via the data capture containers, the configmap object and initiating a capture of the indicated data packets specified by the configmap object.

Figure 4:
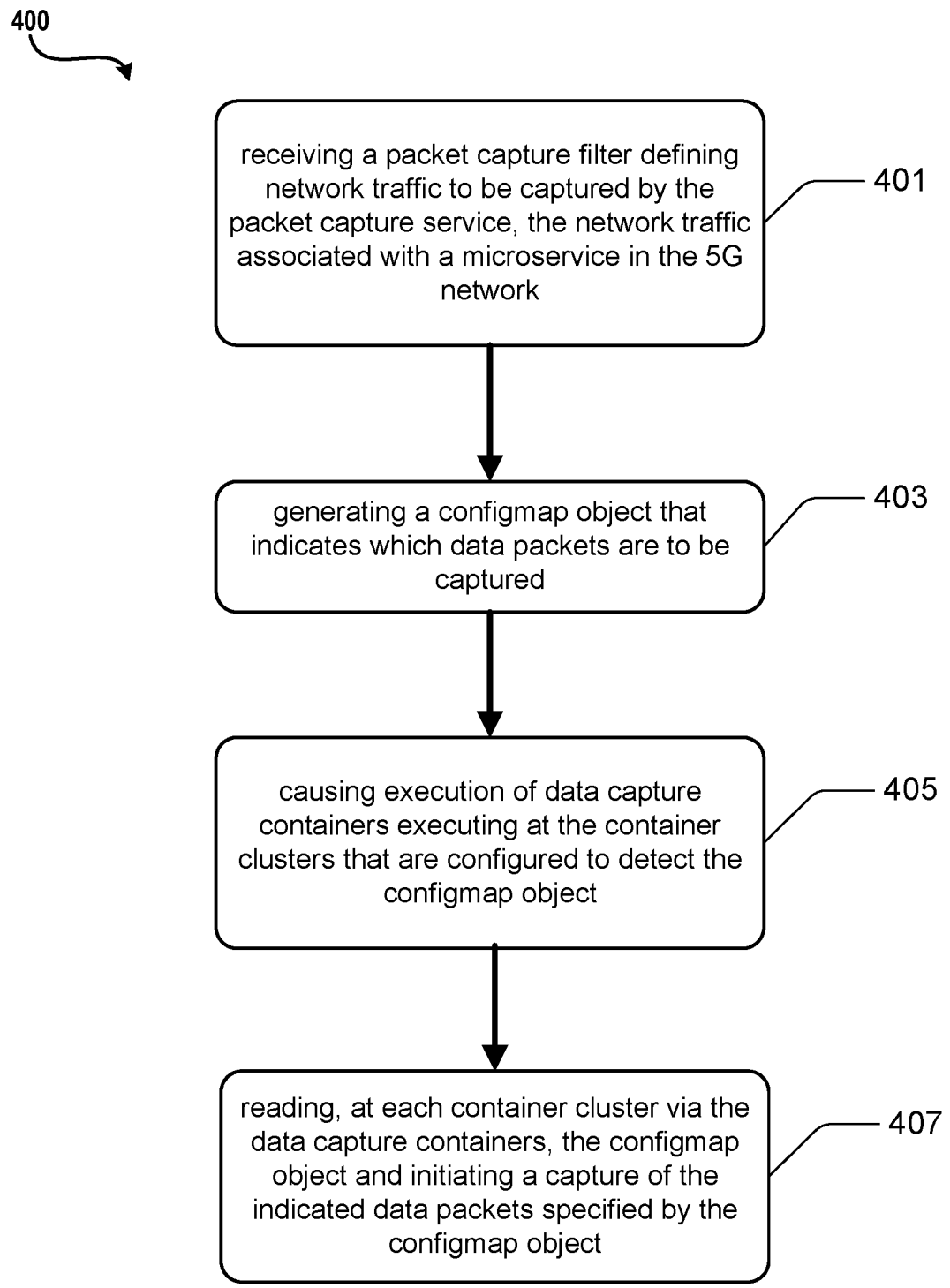
FIG. 4 is a flowchart depicting an example procedure for diagnosing network issues in accordance with the present disclosure.

Referring to FIG. 4, illustrated is another example operational procedure for capturing network traffic associated with a microservice in a 5G network implementing a plurality of network interfaces. In an embodiment, the 5G network hosts a plurality of container clusters executing the microservice. Such an operational procedure may provide for capturing network traffic and can be provided by services shown in FIG. 2. The operational procedure may be implemented in a system comprising one or more computing devices. Referring to FIG. 4, operation 401 illustrates receiving, by a packet capture service executing in the 5G network, a packet capture filter defining network traffic to be captured by the packet capture service, the network traffic associated with a microservice in the 5G network.

Operation 401 may be followed by operation 403. Operation 403 illustrates based on the packet capture filter, generating, by the packet capture service, a configmap object that indicates which data packets are to be captured.

Operation 403 may be followed by operation 405. Operation 405 illustrates causing, by the packet capture service, execution of data capture containers executing at the container clusters that are configured to detect the configmap object.

Operation 405 may be followed by operation 407. Operation 407 illustrates reading, at each container cluster via the data capture containers, the configmap object and initiating a capture of the indicated data packets specified by the configmap object.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 5:
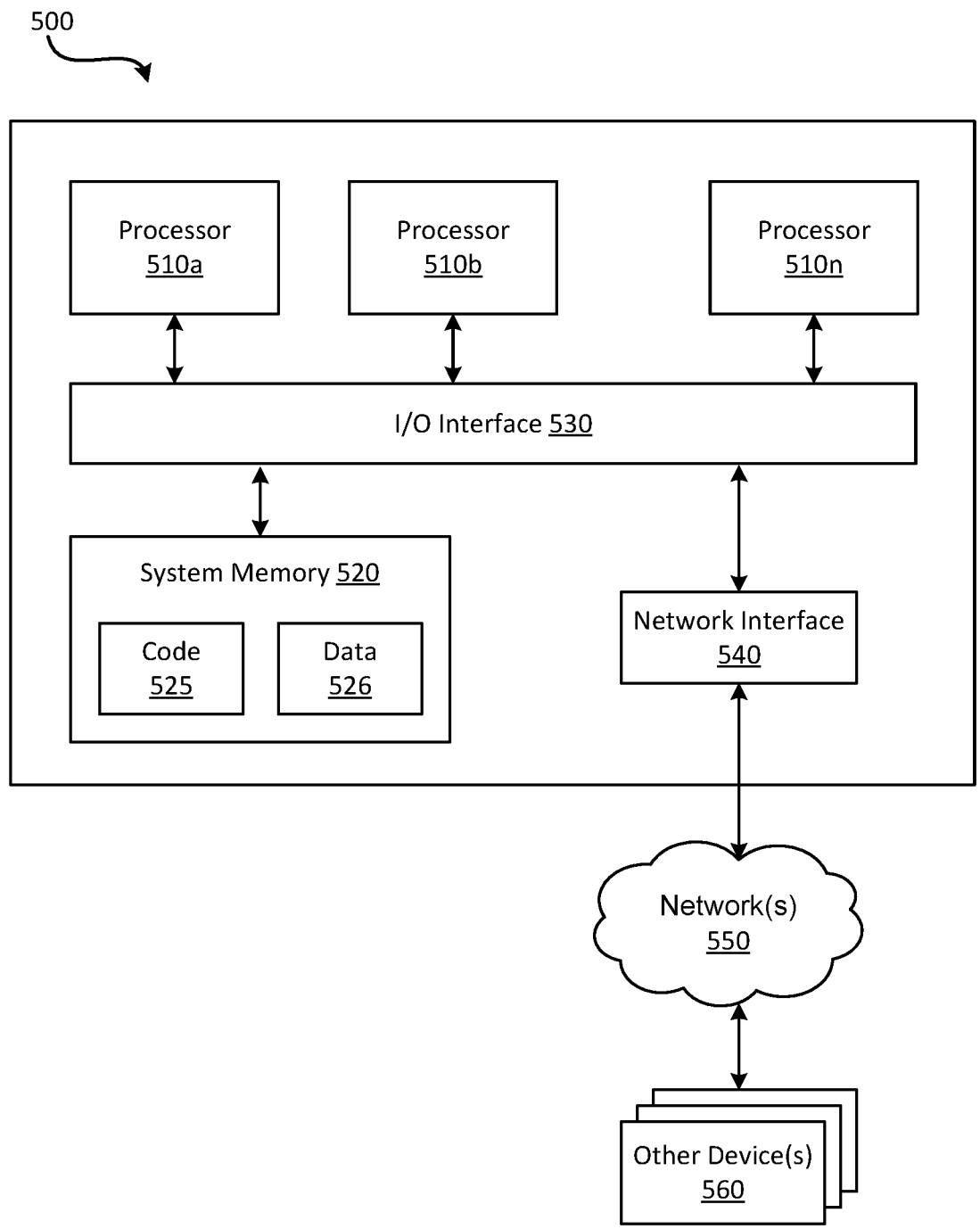
FIG. 5 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for adding a native utility for capturing network traffic across a plurality of interfaces in a cloud computing environment, the cloud computing environment comprising a plurality of computing devices executing a plurality of Kubernetes pods comprising one or more containers, the network traffic associated with a target application or service provided by the Kubernetes pods, the method comprising:

receiving, by a packet capture service executing in the cloud computing environment, a Kubernetes custom resource definition defining an application programming interface (API) endpoint indicative of one or more packet capture filters, wherein the packet capture filters define network traffic to be captured by the packet capture service;

based on the packet capture filters, generating, by the packet capture service, a configmap object that indicates to the Kubernetes pods which data packets are to be captured at the plurality of Kubernetes pods;

causing, by the packet capture service, execution of data capture containers executing at the Kubernetes pods that are configured to detect the configmap object; and reading, at each Kubernetes pod via the data capture containers, the configmap object and initiating a capture of the indicated data packets specified by the configmap object.

Clause 2: The method of clause 1, further comprising generating a declarative specification from the capture filters, wherein the configuration map object is generated based on the declarative specification.

Clause 3: The method of any of clauses 1-2, wherein the configmap object includes information about the packets to be captured, the duration of the capture, and the amount of data for the capture.

Clause 4: The method of any of clauses 1-3, wherein newly instantiated pods distributed computing environment are loaded with the configuration map object and join the capture service.

Clause 5: The method of any of clauses 1-4, further comprising establishing, by the data capture containers, a connection with a capture stream server.

Clause 6: The method of any of clauses 1-5, further comprising:

based on metadata specifying capture details, streaming, by the data capture containers, the captured packets as binary gRPC data to the capture stream server.

Clause 7: The method of clauses 1-6, further comprising parsing, by the capture stream server, the metadata and loading a capture packet file in a directory denoted by a capture ID or rule ID.

Clause 8: The method of any of clauses 1-7, wherein the data capture containers are deployed at selected pods of the plurality of Kubernetes pods.

Clause 9: A method for providing a centralized service for capturing network traffic associated with a microservice in a 5G network implementing a plurality of network interfaces, the 5G network hosting a plurality of container clusters executing the microservice, the method comprising:

receiving, by a packet capture service executing in the 5G network, a packet capture filter defining network traffic to be captured by the packet capture service, the network traffic associated with a microservice in the 5G network;

based on the packet capture filter, generating, by the packet capture service, a configmap object that indicates which data packets are to be captured;

causing, by the packet capture service, execution of data capture containers executing at the container clusters that are configured to detect the configmap object; and reading, at each container cluster via the data capture containers, the configmap object and initiating a capture of the indicated data packets specified by the configmap object.

Clause 10: The method of clause 9, further comprising generating a declarative specification from the capture filters, wherein the configmap object is generated based on the declarative specification.

Clause 11: The method of any of clauses 9 and 10, wherein the configmap object includes information about the packets to be captured, the duration of the capture, and the amount of data for the capture.

Clause 12: The method of any clauses 9-11, wherein newly instantiated pods distributed computing environment are loaded with the configmap object and join the capture service.

Clause 13: The method of any clauses 9-12, further comprising establishing, by the data capture containers, a connection with a capture stream server.

Clause 14: The method of any clauses 9-13, further comprising:

based on metadata specifying capture details, streaming, by the data capture containers, the captured using a streaming protocol.

Clause 15: The method of any clauses 9-14, wherein the data capture containers are deployed in all of the container clusters.

Clause 16: A computer-readable storage medium having computer-executable instructions stored thereupon which, when executed by one or more processors of a computing device, cause the computing device to:

receiving a customer resource definition defining one or more capture filters for capturing network traffic in a distributed computing environment comprising a plurality of computing devices executing a plurality of Kubernetes pods;

based on the capture filters, generating a configmap object specifying data packets to be captured; and causing injection of capture sidecars at the Kubernetes pods, the capture sidecars configured to detect the configmap object and initiate a capture of the specified data packets.

Clause 17: The computer-readable storage medium of clause 16, further comprising generating a declarative specification from the capture filters, wherein the configmap object is generated based on the declarative specification.

Clause 18: The computer-readable storage medium of any of clauses 16 and 17, wherein newly instantiated pods distributed computing environment are loaded with the configmap object and join the capture service.

Clause 19: The computer-readable storage medium of any of the clauses 16-18, further comprising establishing, by the capture sidecars, a connection with a capture stream server.

Clause 20: The computer-readable storage medium of any of the clauses 16-19, further comprising:

based on metadata specifying the capture details, streaming, by the capture sidecars, the captured packets.

What is claimed is:

1. A method for adding a native utility for capturing network traffic across a plurality of interfaces in a cloud computing environment, the cloud computing environment comprising a plurality of computing devices executing a plurality of Kubernetes pods comprising one or more containers, the network traffic associated with a target application or service provided by the Kubernetes pods, the method comprising:

receiving, by a packet capture service executing in the cloud computing environment, a Kubernetes custom resource definition defining an application programming interface (API) endpoint indicative of one or more packet capture filters, wherein the packet capture filters define network traffic to be captured by the packet capture service;

based on the packet capture filters, generating, by the packet capture service, a configmap object that indicates to the Kubernetes pods which data packets are to be captured at the plurality of Kubernetes pods, wherein the configmap object is an API object configured to store data in key-value pairs, and wherein the configmap object is usable by the Kubernetes pods as an environment variable, command-line argument, or configuration file;

causing, by the packet capture service, execution of data capture containers executing at the Kubernetes pods that are configured to detect the configmap object; and reading, at each Kubernetes pod via the data capture containers, the configmap object and initiating a capture of the indicated data packets specified by the configmap object.

2. The method of claim 1, further comprising generating a declarative specification from the capture filters, wherein the configmap object is generated based on the declarative specification.

3. The method of claim 1, wherein the configmap object includes information about the packets to be captured, the duration of the capture, and the amount of data for the capture.

4. The method of claim 1, wherein newly instantiated pods distributed computing environment are loaded with the configmap object and join the capture service.

5. The method of claim 1, further comprising establishing, by the data capture containers, a connection with a capture stream server.

6. The method of claim 5, further comprising:

based on metadata specifying capture details, streaming, by the data capture containers, the captured packets as binary gRPC data to the capture stream server.

7. The method of claim 6, further comprising parsing, by the capture stream server, the metadata and loading a capture packet file in a directory denoted by a capture ID or rule ID.

8. The method of claim 1, wherein the data capture containers are deployed at selected pods of the plurality of Kubernetes pods.

9. A method for providing a centralized service for capturing network traffic associated with a microservice in a 5G network implementing a plurality of network interfaces, the 5G network hosting a plurality of container clusters executing the microservice, the method comprising:

receiving, by a packet capture service executing in the 5G network, a packet capture filter defining network traffic to be captured by the packet capture service, the network traffic associated with a microservice in the 5G network;

based on the packet capture filter, generating, by the packet capture service, a configmap object that indicates which data packets are to be captured, wherein the configmap object is an API object configured to store data in key-value pairs, and wherein the configmap object is usable as an environment variable, command-line argument, or configuration file;

causing, by the packet capture service, execution of data capture containers executing at the container clusters that are configured to detect the configmap object; and reading, at each container cluster via the data capture containers, the configmap object and initiating a capture of the indicated data packets specified by the configmap object.

10. The method of claim 9, further comprising generating a declarative specification from the capture filters, wherein the configmap object is generated based on the declarative specification.

11. The method of claim 9, wherein the configmap object includes information about the packets to be captured, the duration of the capture, and the amount of data for the capture.

12. The method of claim 9, wherein newly instantiated pods distributed computing environment are loaded with the configmap object and join the capture service.

13. The method of claim 9, further comprising establishing, by the data capture containers, a connection with a capture stream server.

14. The method of claim 13, further comprising:

based on metadata specifying capture details, streaming, by the data capture containers, the captured using a streaming protocol.

15. The method of claim 9, wherein the data capture containers are deployed in all of the container clusters.

16. A computer-readable storage medium having computer-executable instructions stored thereupon which, when executed by one or more processors of a computing device, cause the computing device to perform operations rising:

receiving a customer resource definition defining one or more capture filters for capturing network traffic in a distributed computing environment comprising a plurality of computing devices executing a plurality of Kubernetes pods;

based on the capture filters, generating a configmap object specifying data packets to be captured, wherein the configmap object is an API object configured to store data in key-value pairs, and wherein the configmap object is usable by the Kubernetes pods as an environment variable, command-line argument, or configuration file; and causing injection of capture sidecars at the Kubernetes pods, the capture sidecars configured to detect the configmap object and initiate a capture of the specified data packets.

17. The computer-readable storage medium of claim 16, further comprising computer-executable instructions stored thereupon which, when executed by one or more processors of a computing device, cause the computing device to perform operations comprising generating a declarative specification from the capture filters, wherein the configmap object is generated based on the declarative specification.

18. The computer-readable storage medium of claim 16, wherein newly instantiated pods distributed computing environment are loaded with the configmap object and receive the capture sidecars.

19. The computer-readable storage medium of claim 16, further comprising computer-executable instructions stored thereupon which, when executed by one or more processors of a computing device, cause the computing device to perform operations comprising establishing, by the capture sidecars, a connection with a capture stream server.

20. The computer-readable storage medium of claim 19, further comprising computer-executable instructions stored thereupon which, when executed by one or more processors of a computing device, cause the computing device to perform operations comprising:

based on metadata specifying capture details, streaming, by the capture sidecars, the captured packets.

* * * * *